Dec. 6, 1966  D. M. JACKSON  3,290,068
FLUID COUPLING
Filed Feb. 15, 1965
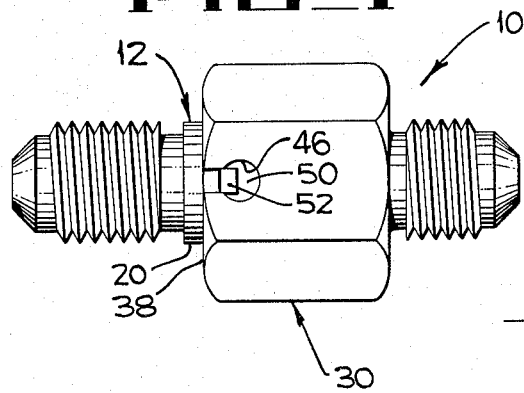
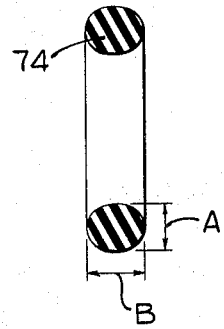
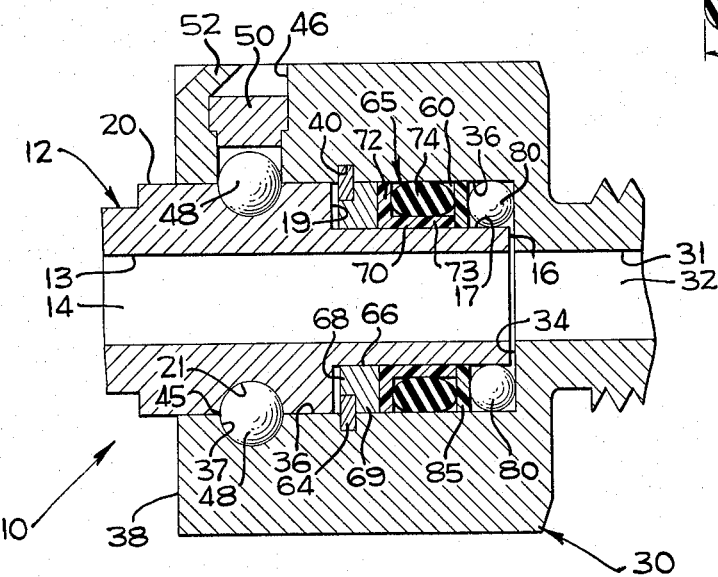
INVENTOR
DONALD M. JACKSON
BY Hans G. Hoffmeister.
ATTORNEY

United States Patent Office 3,290,068
Patented Dec. 6, 1966

3,290,068
FLUID COUPLING
Donald M. Jackson, Whittier, Calif., assignor to FMC Corporation, San Jose, Calif., a corporation of Delaware
Filed Feb. 15, 1965, Ser. No. 432,586
6 Claims. (Cl. 285—276)

The present invention pertains to a fluid coupling and more particularly to a swivel joint of minimum size and having a packing capable of preventing leakage while operating for extended periods of time at high pressures and over a wide temperature range.

Swivel joints which are used in the rotor head of a helicopter must pass very demanding tests before they are acceptable. For example, in one such installation, these joints must oscillate 12,000,000 times through an angle of 15° in a period of 1,000 hours must contain fluids under pressures as high as 3,000 p.s.i.; and must withstand a temperature of 275° F. for seven days immediately followed by successive changes to minus 65° F., plus 275° F., minus 65° F. and plus 225° F., each successive change being maintained for a predetermined period. Moreover, these joints must be of such small size as to be capable of use in fluid system employing conduits or tubes whose outside diameter is as small as one-quarter inch. There are other design requirements, but the foregoing serve to illustrate the rigid standards which must be met.

The subject invention was developed because the small size or miniaturized swivel joints capable of use in one-quarter inch systems prior to the present invention were incapable of performing successfully under the foregoing conditions. In the known joints, one of the specific problems is that the packing is inadequate to withstand the long and continuous oscillations at such extremes of temperature and pressure.

An object of the present invention is to provide an improved swivel joint.

Another object is to provide a swivel joint of minimum size such as is capable of use in fluid systems employing conduits as small as one-quarter inch in outside diameter.

Another object is to provide a swivel joint capable of preventing leakage while operating for extended periods of time at high pressures and over a wide temperature range.

Another object is to minimize variations in squeeze on a packing for a swivel joint.

Another object is to provide a swivel joint in which the axial thrust imposed on the balls or other rotary interconnecting means, is minimized.

Another object is to provide a swivel joint in which a retaining ring for holding the packing in place is positively maintained in its groove.

Another object is to minimize fatigue and compression set of an O-ring used in a packing of a swivel joint.

These, together with other objects, will become apparent upon reference to the following descripiton and accompanying drawing in which:

FIGURE 1 is a side elevation of a miniaturized swivel joint incorporating the principles of the present invention.

FIGURE 2 is a fragmenetary longitudinal section through the swivel joint of FIGURE 1.

FIGURE 3 is a detail cross-section of a seal used in the packing of the subject joint.

Referring more particularly to the drawing, a swivel joint embodying the present invention is generally indicated by the numeral 10. This joint includes a male conduit 12 having an internal wall 13 surrounding a passage 14, an end edge 16, a first external cylindrical wall 17, a radial shoulder 19, and a second external cylindrical wall 20, the latter having an annular recess 21.

The swivel joint 10 also includes a female conduit 30 having a first internal wall 31 surrounding a passage 32, a radial shoulder 34, a second internal cylindrical wall 36 in which is provided an annular recess 37, and an end 38. The second internal wall has an annular groove 40 therein.

In assembly of the joint 10, the male conduit 12 is rotatably fitted within the female conduit 30 so that the first wall 17 of the male conduit is spaced radially inward from the second wall 36 of the female conduit and so that the annular recesses 21 and 37 form an annular raceway 45. The female conduit also has an opening 46 communicating with the raceway and through which main balls 48 are admitted to the raceway wherein they rotatably interconnect the conduits and preclude axial separation thereof. A plug 50 is positioned in the opening for retaining the balls in the raceway, and a portion 52 of the female conduit is staked against the plug for retaining the same in the opening.

In its assembled condition, the swivel joint 10 defines a packing chamber 60 between the first and second walls 17 and 36 and between the shoulders 19 and 34. This chamber has a substantially uniform radial dimension from one shoulder to the other when the passages 14 and 32 are precisely coaxial. A resiliently diametrically compressible retaining ring or snap ring 64 is fitted in the groove 40 and is thus mounted in the female conduit 30 and projects into the packing chamber adjacent to the radial shoulder 19.

A packing 65 is located in the chamber 60 between the retaining ring 64 and the shoulder 34 of the female conduit 30. This packing includes a rigid annular seal retainer 66 having an axial flange 68 within the retaining ring and circumscribing the first wall 17 and a radial flange 69 against one of the radial surfaces of the retaining ring and engaging the second internal wall 36 of the female conduit. The retainer 66 is preferably of metal and extends without interruption about the male conduit.

The packing 65 also includes an annular seal 70 having an L-shaped cross-section and of a relatively rigid, hard, non-elastomeric plastic material such as Teflon, Kel-F or the like. This seal is placed in back-to-back relation with the retainer and thus has a radial flange 72, which is against the radial flange of the retainer 66 and extends outward to the second internal wall 36, and an axial flange 73, which is in circumscribing engagement with the first wall 17 of the male conduit. Still further, the packing includes an annular energizer 74 in the form of an O-ring preferably having an oval cross-section in its unstressed condition and preferably made of rubber. The energizer is positioned in circumscribing relation to the seal against the radial and axial flanges thereof.

Insofar as packing 65 is concerned, several features are worthy of note. Although it is highly desirable to use a seal 70 of the described type of material, a problem is presented in that the seal is not diametrically distortable; thus, it is necessary to use a retaining ring 64 which can be removed to permit insertion or removal of the seal without need for distortion to a diameter less than that of the ring 64. Use of a removable retaining ring, however, presents the problem of positively maintaining the same in its groove so as to avoid blowout. Accordingly, in the present swivel joint, the seal retainer 66 positively holds the retaining ring in its groove 40.

Concerning the energizer 74, it has been determined that one of the main causes of premature failure of swivel joint packings is in the use of an O-ring of extremely small cross-section. For example, the standard cross-sectional dimension (i.e., circular cross-section) of an O-ring having an inside diameter of 0.3 inch is 0.070 inch; in other words, in this standard O-ring, a transverse section through the ring yields a circular cross-section having a diameter of 0.070 inch. When this standard O-ring is subjected to the above-described successive changes in temperature, the rubber weakens and loses its resiliency so that the O-ring fails to perform its sealing function. This condition is known as thermal cycle fatigue and permanent set. By using an oval cross-section, the amount of rubber in the O-ring is increased whereby the energizer resists for a longer period of time the described weakening and loss of resilience. For example, in one embodiment of the present invention, the radial dimension A (unstressed—FIG. 3) is 0.070, but the axial dimension B (unstressed) is 0.100, both in a small size O-ring having an inside diameter of 0.3 inch; in this example the energizer has over 30 percent more volume of rubber and is better able to withstand the changes in temperature. Therefore, although the subject packing may use an O-ring with a circular cross-section, an O-ring with an oval cross-section is preferred.

As further protection for the packing 65, a series of auxiliary balls 80 are positioned in the chamber 60 adjacent to the shoulder 34 of the female conduit 30. These balls are of metal like the main balls 48 but are of a smaller diameter than the main balls. An annular spacer 85 surrounds the first external wall 17 of the male conduit 12 and is positioned between the seal 70 and energizer 74, and the auxiliary balls. The spacer is of the same material as the seal; its function is to keep the seal and energizer from contacting the auxiliary balls and to provide a more uniform squeeze on the energizer. The purpose of the auxiliary balls is to minimize variation in squeeze on the packing 65 and thereby increase the life of the seal 70 and energizer 74; expressed otherwise, these auxiliary balls maintain a substantially uniform radial dimension in the packing chamber 60 since they resist any tendency of the conduits 12 and 30 to move out of a precisely coaxial relation.

It is believed evident that the packing 65 is inserted before the male conduit 12 is positioned in the female conduit 30. The procedure for assembling the packing is as follows:

First, the spacer 85, the seal 70 and its surrounding energizer 74, and the seal retainer 66 are successively placed in the female conduit 30 against the second internal wall 36. These four elements 66, 70, 74 and 85 are pushed toward the shoulder 34 in order to enable placement of the retaining ring 64 in the groove 40. With the retaining ring in place, all four elements are moved toward the end 38 of the female conduit, and the axial flange 68 of the retainer is seated within the retaining ring. Next, the auxiliary balls 80 are positioned between the spacer and the shoulder 34, being held in place by grease or the like. Thereafter, the male conduit is inserted and held against axial separation from the female conduit by the main balls 48, as is believed understood. As installed, the seal is slightly pre-loaded in both dimensions A and B.

There is special significance in the use of the auxiliary balls 80 for minimizing variation in squeeze on the packing 65. A sleeve type bearing, not shown, would function to maintain the radial dimension of the chamber 60 uniform, but if such a sleeve bearing were employed, it would not be possible to assemble the spacer 85, the packing 65, and the retaining ring 64 in the above-described manner since it would be necessary to insert the sleeve bearing first and, with such an element in place, the packing and spacer could not be slid toward the shoulder 34 to permit installation of the retaining ring. In addition to this advantage, the auxiliary balls minimize friction and thus reduce the torque required to rotate the joint 10.

In operation of the joint 10, internal fluid pressure tending to separate the conduits 12 and 30 is imposed on the main balls 48 through the end edge 16 and also on the retaining ring 64 through the packing 65. Herein, therefore, lies another advantage of the retaining ring. If the packing were allowed to bear directly against the shoulder 19, the main balls would have to bear more of this separating thrust than they have to bear with the described construction. In action embodiments of the joint, the total thrust borne by the retaining ring is about four times the amount of thrust borne by the main balls. Since the load on the main balls is reduced, the balls may be made smaller in diameter and fewer in number whereby the over-all diameter of the joint can be reduced. Thus, because of this retaining ring and its use in the described joint, the joint can be made of a minimum size.

The joint of the present invention has been tested under the conditions set forth above. This is, this joint will operate without leaking when oscillated for 12,000,000 times through a 15° angle during a period of 1,000 hours. It can operate while containing fluids under pressures of up to 3,000 p.s.i. and it is capable of withstanding temperatures from minus 65° F. to plus 275° F. for extended periods and can operate successfully if the temperatures are rapidly changed between these extremes, as described above. It is of special importance that these advantages are achieved in a miniaturized size such as, for example, in a fluid system using conduits having an outside diameter of one-quarter inch. In a swivel joint useful for this type of system, the maximum outside diameter of the female conduit 30 is approximately three-quarters of an inch and the axial dimension between the end 38 and the shoulder 34 is approximately three-quarters of an inch.

From the foregoing, it will be evident that a miniaturized swivel joint has been provided which is capable of operating successfully over a wide temperature range and under high pressures. The joint has particular application in those operations, such as aircraft, where it is desired to minimize weight and size and where continuous and dependable use is mandatory.

Although a preferred embodiment of the present invention has been shown and described, it will be understood that various changes and modifications may be made in the details thereof without departing from the spirit and the scope of the amended claims.

Having thus described the invention, what is claimed as new and desired to be secured by Letters Patent is:

1. In a fluid point including a female conduit having an internal circumferential wall terminating in an end, and a shoulder projecting inward from said wall; a male conduit projecting into the female conduit and having an end edge adjacent to said shoulder and an external circumferential wall spaced inward from said internal wall, said internal and external walls and said shoulder defining a chamber, said conduits having an annular raceway therebetween; rollable members in said raceway, said female conduit having means for removing said rollable members from said raceway, said male conduit being freely slidable into and out of said female conduit when said rollable members are out of said raceway; the combination of a resiliently diametrically contractible ring releasably mounted in said internal wall and projecting from said internal wall into the chamber; packing means in said chamber between the ring and the shoulder, said packing means including a substantially diametrically rigid annular seal having an outside diameter greater than the inside diameter of the ring, said packing means being urged by fluid pressure internally of the conduits against said ring; and a plurality of rollable members in the chamber releasably positioned between said shoulder of the female conduit and the packing means, said last-mentioned members engaging said shoulder of the female conduit, said packing means and said internal and external walls.

2. In a fluid joint including a female conduit having an end, an internal circumferential wall terminating in said end, and a shoulder projecting inward from said wall, said wall having an annular groove therein; a male conduit projecting into the female conduit, said male conduit having an end edge adjacent to said shoulder, a first external wall spaced inward from said internal wall, a shoulder projecting out from said first wall, and a second external wall closer to said internal wall than said first wall, said internal wall, shoulders and first wall defining an annular packing chamber of substantially uniform radial dimension from one of said shoulders to the other of said shoulders when said conduits are coaxial, said female conduit being of one-piece construction between said shoulders; means rollably engaging said conduits between said chamber and said end of the female conduit for rotatably interconnecting and preventing axial separation of the conduits, said female conduit containing means to enable removal of said rollably engaging means from between said conduits whereby said male conduit is axially slidable out of said female conduit; a retaining ring releasably fitted in said groove and projecting into said chamber; packing means in said chamber between the ring and the shoulder on the female conduit, said packing means including a substantially diametrically rigid annular seal having an outside diameter greater than the inside diameter of the ring, and said packing means being urged by fluid pressure internally of the conduits against said ring whereby the force against said rollably engaging means which tends axially to separate said conduits is substantially equal to the fluid pressure against said end edge of the male conduit; and rollable members in said chamber between the packing means and the shoulder on the female conduit and circumferentially bearing against the internal wall of the female conduit and the first external wall of the male conduit and maintaining said conduits coaxial and thus said radial dimension of the chamber substantially uniform.

3. The joint of claim 2 wherein said packing means includes an annular retainer having an axial flange circumscribing said first external wall and disposed within said ring and a radial flange projecting outward against said ring.

4. The joint of claim 2 wherein said rollable members are balls, wherein said packing means includes an annular spacer around said male conduit between said balls and said energizer, and wherein said rollably engaging means are balls of a greater diameter than the balls in said chamber.

5. The joint of claim 3 wherein said seal is L-shaped in radial cross-section and includes a radial flange against said retainer and an axial flange against said first external wall, and wherein said packing means includes an annular energizer against the radial flange of the seal, said energizer circumscribing the axial flange of the seal and having an outer surface engaging the internal wall of the female conduit.

6. The joint of claim 5 wherein the radial cross-section of the energizer is oval both when the energizer is unstressed and when the energizer is stressed so that its axial dimension is greater than its radial dimension.

References Cited by the Examiner

UNITED STATES PATENTS

| | | | |
|---|---|---|---|
| 2,443,993 | 6/1948 | Schenkelberger | 285—276 X |
| 2,768,358 | 10/1956 | Moseley et al. | 285—276 X |
| 2,905,489 | 9/1959 | Thompson et al. | 277—188 X |
| 2,963,304 | 12/1960 | Comlossy et al. | 285—98 X |
| 3,011,803 | 12/1961 | Buckner et al. | 285—98 X |
| 3,089,713 | 5/1963 | Scaramucci | 285—98 X |

THOMAS F. CALLAGHAN, *Primary Examiner.*

T. A. LISLE, *Assistant Examiner.*

UNITED STATES PATENT OFFICE
CERTIFICATE OF CORRECTION

Patent No. 3,290,068 December 6, 1966

Donald M. Jackson

It is hereby certified that error appears in the above numbered patent requiring correction and that the said Letters Patent should read as corrected below.

Column 4, line 42, for "point" read -- joint --.

Signed and sealed this 7th day of November 1967.

(SEAL)
Attest:

Edward M. Fletcher, Jr.
Attesting Officer

EDWARD J. BRENNER
Commissioner of Patents